Dec. 11, 1951  F. G. BACK ET AL  2,578,624
THREE COMPONENT LENS SYSTEM OF THE PETZVAL TYPE
Filed May 3, 1949
*In this patent the radii are + or − according to whether their surface is convex or concave relative to the element to which the surface belongs.*
T2043
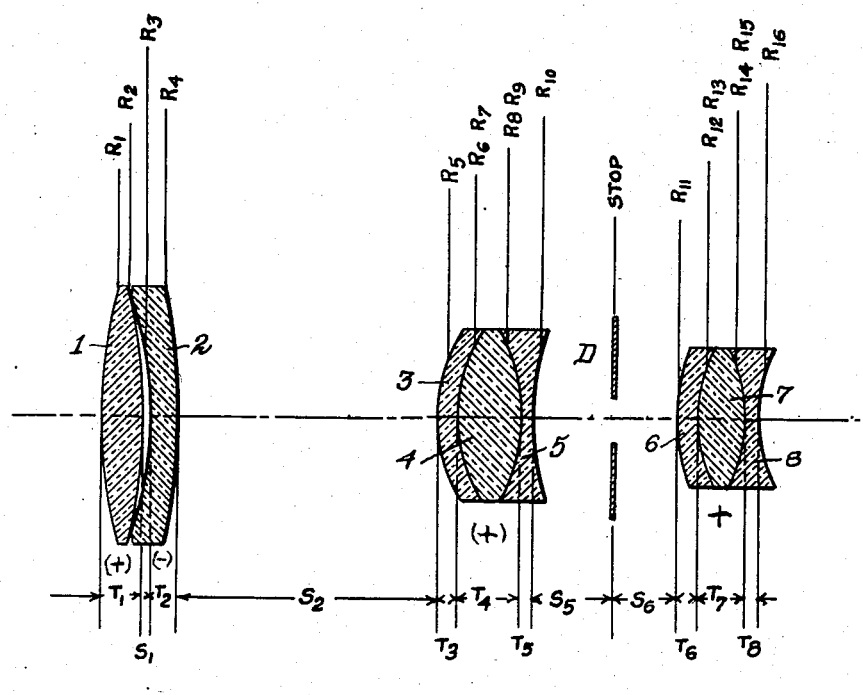
Inventors
Frank G. Back
and Herbert Lowen
By
Munn, Liddy & Glaccum
Attorneys Patented Dec. 11, 1951

2,578,624

UNITED STATES PATENT OFFICE 2,578,624

THREE-COMPONENT LENS SYSTEM OF THE PETZVAL TYPE

Frank Gerard Back, New York, and Herbert Lowen, Forest Hills, N. Y.; said Lowen assignor to said Back Application May 3, 1949, Serial No. 91,132

1 Claim. (Cl. 88—57)

This invention relates to new and useful improvements in camera lenses and particularly to improvements in the types of lenses known as the "Petzval" lens.

The object of the invention is to provide an improved lens of the "Petzval" type which is particularly adapted to modern uses in television and infra-red photography.

A further object is to provide a lens of the mentioned improved form, which is to a greater extent corrected for color; has greater speed; and has a much flatter field.

Further and more specific objects, features, and advantages will more clearly appear from a consideration of the detailed specification hereinafter set forth especially when taken in connection with the accompanying drawings which illustrate a present preferred form which the invention may assume and which form part of the specification.

With respect to objectives of the so-called "Petzval" type, of which this invention is an improvement, such a lens has consisted heretofore and customarily of an achromatic positive front doublet and an achromatic positive rear doublet, either cemented or with a small air-gap between the two elements of each doublet. This type of lens has been known to the art for nearly one hundred years, and has the advantage of being free from spherical aberration and coma for a very great relative aperture. It is also practically free of distortion. Its disadvantage lies in the fact that it suffers from curvature of field because it consists of only positive elements. This curvature of field can be compensated for by judiciously placing the aperture stop and, thereby introducing a certain amount of negative astigmatism. But, even so, the field angle which can be satisfactorily covered by such a lens, is very small because at greater angular extent of the field, this astigmatic difference becomes so pronounced that the circle of least confusion between the primary and secondary focus becomes too great to yield a sufficient resolution at the margin of the field. Many variations of the "Petzval" principle have been proposed, but the chromatic correction of all these designs is only for a relatively small range of the light spectrum, and even then suffers from secondary color. This limits the use of these types of "Petzval" lenses for modern photographical purposes and also for television, where sensitivity of the image transmitting tube changes from infra-red to ultra-violet even on the same type of tube. In a recent invention, the rear element of this type of lens has been split up into two doublets, but all these inventions still allow only coverage of a relatively small field if half-way satisfactory resolution is required.

In brief and general terms, the invention herein concerns the replacement of the rear doublet or doublets of the "Petzval" type of lens by a plurality of cemented achromats, at least one of which has to be a triplet with special properties which will be later explained. By this replacement we gain the following advantages:

Color correction

A single lens is afflicted with so-called chromatic aberration, i. e., it refracts the differently colored light waves, of which ordinary light is composed, in a different way so that, for instance, the blue waves have a different focal point than the red waves. It is well known in the art that by combining a positive lens of low dispersion with a negative lens of high dispersion in such a way that the difference between their respective powers equals the required total power, it is possible to obtain a positive lens which shows no chromatic difference between red and blue. But such an achromatic doublet still has secondary color because two elements allow the correction for only two waves. It is of course, possible to make any two light waves fall together, but if these two light waves lie too far apart, the so-called secondary spectrum becomes so bad that it seriously affects the performance of the lens. On the other hand, the requirements of television and infra-red photography have greatly extended the range of the light spectrum which is used for image formation. A good lens therefore, should be corrected from ultra-violet to infra-red, i. e., for a range of from 400–700 millimicrons. It is self-evident that a doublet can not be corrected for such a range.

A triplet gives a third degree of freedom which allows the correction for three waves instead of the customary two waves. The secondary spectrum is therefore completely eliminated and by judiciously selecting the three corrected rays, tertiary color residua can be kept so small that they do not impair the image. It is necessary that each component triplet be achromatized in itself. This is because if the color corrections were to be split up between the rear elements it would be possible to correct a "Petzval" type objective longitudinally even with doublets if a plurality of them are used. However, in that case, a very objectionable transversal color or color of magnification would result. It therefore, has been found that longitudinal and transversal correction for three colors can only be achieved by triplets.

Greater speed

It has been pointed out that a "Petzval" type lens can be corrected for a large relative aperture. It is, of course, possible to correct a "Petzval" type doublet system even for a speed of $f:1$, but such a lens would be so badly corrected for zonal aberration that it could not be used for photographic or television purposes even if the marginal ray would not show any aberration at all. By using triplets, we have found that an additional degree of freedom is achieved which can be used to reduce the zonal spherical aberration. Our lens can be designed for a relative aperture of $f:1.15$ and its zonal spherical aberration for any zone will still lie far within the accepted tolerances. Due to the inherent freedom of offense against sine-condition which is one of the main characteristics of the usual "Petzval" system, this improved lens will not show any noticeable amount of coma. It also shows no shift in focus if it is stopped down, due to its freedom from zonal aberrations.

The flatness of field

The improved lens constructed according to this invention has a much flatter field than any of the usual "Petzval" systems previously designed, for the following two-fold reasons:

1. By using at least one triplet instead of doublets, the refractive power of each component surface, especially of the positive surfaces, can be held weaker than is the case of doublets. The power of these refractive surfaces, independent of their spacing, determine the so-called "Petzval" curve, i. e., the locus of third order astigmatic correction. In other words, if the primary and secondary focus coincide, they lie on the "Petzval" curve. It stands to reason that the flatter the "Petzval" curve, the less negative astigmatism is required to obtain a completely flat field and therefore, the negative astigmatism necessary to bring a marginal image point close to the Gaussian image plane is relatively small.

2. By using two triplets, it is possible to use one triplet to achieve the whole spherical correction of the system without the need of unreasonably steep curvatures. The second triplet can then be used to fulfill the so-called Steinheil condition (as stated in Eder's Jahrbuch, 1897, "Origin and History of the Orthostigmats"). This condition is to the effect that "An objective may be corrected for spherical aberration if two media are separated by a convex surface turned towards the medium of higher refraction and may be corrected for astigmatism if the surface is concave to the medium having the higher refraction." For the first doublet, the combination of so-called "old" glasses, namely a low refractive, low dispersing crown combined with a high refractive, high dispersing flint is used. For the second triplet, a combination of "new" glasses is used, namely, a crown of high refraction but of low dispersion combined with a low refractive flint of high dispersion.

We use for our first triplet a combination of borosilicate crown #2 with dense barium flint #1, while the second triplet is formed of dense barium crown #1 and light flint #2. (These glasses especially the first combination, are characterized by very low color residua so that it is possible to get sufficient color correction with only two types of glass in each triplet.) Though third order astigmatism always shows the ratio of three to one between primary and secondary focus as referred to the "Petzval" curve, at greater angular extent higher order astigmatism comes into play, and partially corrects this astigmatic difference, if the Steinheil condition is fulfilled. The rate at which the astigmatic difference increases as the ratio of focal length to field decreases, is therefore greatly reduced if the second triplet is used to fulfill the Steinheil condition.

The use of triplets therefore, not only reduces the amount of corrective astigmatism necessary to obtain a flat field, but it enables the designer to keep the astigmatic difference sufficiently small to insure a good image quality in the corner even at a larger angular extent of the field.

If a combination of a cemented triplet with a cemented doublet is used, the achromatization for the wide color-range has to be achieved by the triplet. The doublet is achromatized in the usual way for "C" and "F." The glasses for the doublet have to be chosen in such a way that minimum secondary color results, regardless of the influence of this glass combination on spherical aberration. Instead of lowering the aberration parabola by a different choice of glass, as is customary in the art, the spherical correction in this case is achieved by an over correction of the triplet which lies in front of the doublet. The purpose of combining a triplet with a doublet is to achieve a longer back-focal length. If the extra axial aberration of a specific design of this type requires a correction by application of the "Steinheil" condition, the triplet has to achieve the whole spherical correction while the rear doublet is composed of "new" glasses, as described above. The modern high-refractive low-dispersion crown in conjunction with an appropriate light or extra-light flint allows a combination of low secondary color.

In the drawings herein, the single figure shows the front doublet comprising the lenses 1 and 2; the front triplet comprising the lenses 3, 4 and 5; the diaphragm D; and the rear triplet comprising the lenses 6, 7 and 8. The following specification table is for an embodied form of "Petzval" type lens improved in accordance with the herein invention:

[F = 100 mm.]

| Lens | Glass | Radii | Thickness and Separation |
|---|---|---|---|
| $L_1$ | BSC = -2<br>ND = -1.517<br>$v$ = -64.5 | $R_1$ = +103.47<br>$R_2$ = +103.47 | $T_1$ = -18 |
| $L_2$ | DF = -2<br>ND = -1.617<br>$v$ = -36.6 | $R_3$ = -100.73<br>$R_4$ = +1151.84 | $S_1$ = 0.23<br>$T_2$ = 3.60 |
| $L_3$ | DF = -2<br>ND = -1.617<br>$v$ = -36.6 | $R_5$ = +61.45<br>$R_6$ = -61.45 | $S_2$ = 98.92<br>$T_3$ = 2.09 |
| $L_4$ | BSC = -2<br>ND = -1.517<br>$v$ = -64.5 | $R_7$ = +61.45<br>$R_8$ = +61.45 | $S_3$ = .00<br>$T_4$ = 7.21 |
| $L_5$ | DF = -2<br>ND = -1.617<br>$v$ = -36.6 | $R_9$ = -61.45<br>$R_{10}$ = -761.58 | $S_4$ = .00<br>$T_5$ = 2.09 |
| $L_6$ | LF = -2<br>ND = -1.5795<br>$v$ = -41. | $R_{11}$ = +81.59<br>$R_{12}$ = -41.10 | $S_5$ = 3.00<br>$S_6$ = 3.00<br>$T_6$ = 2.40 |
| $L_7$ | DBC = -1<br>ND = -1.611<br>$v$ = -58.4 | $R_{13}$ = +41.10<br>$R_{14}$ = +107.47 | $S_7$ = .00<br>$T_7$ = 7.21 |
| $L_8$ | LF = -2<br>ND = -1.5795<br>$v$ = -41. | $R_{15}$ = -107.47<br>$R_{16}$ = -286.15 | $S_8$ = .00<br>$T_8$ = 2.40 |

The above mentioned symbols employed in the table may be divided as follows:

BSC = Borosilicate crown.
DF = Dense flint.
DBC = Dense barium crown.
LF = Light flint.
ND = Index of refraction for sodium light (5893-A).
$v$ = So-called Abbe number, mean relative dispersion.
R = Radius of curvature of refracting surface of lens.
S = Axial spacing of the lens elements or components.
T = Axial thickness of the lens element.
F = Focal length of the objective system.

Summary

The new feature of our lens consists in splitting up the positive rear doublets of the usual "Petzval" type lens into a plurality of cemented achromats, at least one of which must be a triplet. The additional freedom gained by this procedure is used to correct the lens for three different colors. As stated before, each of the two rear elements has to be achromatized by itself to prevent transversal color. By appropriately selecting the kind of glass of which the achromats are composed, the tertiary color residua can be kept so small as to be practically negligible even if the two border rays for which correction is achieved lie in the infra-red and ultra-violet part of the spectrum.

The use of the triplets allows the designer to correct the lens spherically for a very large aperture. In this case, the additional degree of freedom can be used to correct zonal spherical aberration to such an extent, that the lens can be stopped down without noticeable shift of focus.

The lens can be designed for a considerably larged field angle than another former type of "Petzval" lens. On the one hand, the "Petzval" sum is smaller than if the lens were composed of doublets, and on the other hand, the spherical correction of the field can be achieved by one triplet alone so that the other triplet can be composed of "new" glasses which fulfill the Steinheil condition and thereby render harmless the negative astigmatism necessary for flattening the field. If this method were tried with doublets, the cemented curvature used for spherical correction would become so steep that that particular lens element would cut down the aperture even if it had the form of a hemisphere. It goes without saying that such an extreme shape would have innumerable other effects like extra-axial aberration, vignetting by total reflection, etc. The only way to incorporate the teachings of Steinheil into a "Petzval" type of lens, is by the use of triplets as described herein. As a front lens there is used the customary doublet which, as a rule, has a cemented negative surface between the crown and the flint element. If an additional degree of freedom for correction is required, we may introduce an air-gap in this front doublet. For the color correction, it is sufficient if the front lens has the usual red blue correction provided that glasses with sufficiently small residual color are used. The correction for the region beyond the C- and F- line as well as the deviation for the D- line, is compensated for in the rear triplets.

If the lens with extra-long back-focal length is required, a triplet in combination with the doublet is used. The triplet is apochromatic while the doublet consists of a glass combination of low secondary color. If the angular extent of the field requires fulfillment of the "Steinheil" condition, the triplet has to achieve the full spherical correction while the doublet, which forms the last component of the system, is made of a high-refractive, low-dispersion crown in combination with a low refractive, high-dispersive flint.

While the invention has been described in detail and with respect to the preferred form shown in the drawings, it is not to be limited to such details and forms since many changes and modifications may be made in the invention without departing from the spirit and scope of the invention in its broadest aspects. Hence, it is intended to cover any and all forms and modifications of the invention which may come within the language or scope of the appended claim.

What we claim as our invention, is:

An objective of the Petzval type comprising a front doublet and two rear triplets having the following characteristics:

[Equivalent Focal Length=100 mm. Radii, Thickness and Separation in mm.]

| Lens | Glass | Radii | Thickness and Separation |
|---|---|---|---|
| $L_1$ | BSC $\nu=-2$<br>ND $=-1.517$<br>$v=-64.5$ | $R_1=+103.47$<br>$R_2=+103.47-$ | $T_1=-18$ |
| $L_2$ | DF $\nu=-2$<br>ND $=-1.617$<br>$v=-36.6$ | $R_3=-100.73$<br>$R_4=+1151.84-$ | $S_1=0.23$<br>$T_2=3.60$ |
| $L_3$ | DF $\nu=-2$<br>ND $=-1.617$<br>$v=-36.6$ | $R_5=+61.45$<br>$R_6=-61.45$ | $S_2=98.92$<br>$T_3=2.09$ |
| $L_4$ | BSC $\nu=-2$<br>ND $=-1.517$<br>$v=-64.5$ | $R_7=+61.45$<br>$R_8=+61.45$ | $S_3=.00$<br>$T_4=7.21$ |
| $L_5$ | DF $\nu=-2$<br>ND $=-1.617$<br>$v=-26.6$ | $R_9=-61.45$<br>$R_{10}=-761.58$ | $S_4=.00$<br>$T_5=2.09$ |
| $L_6$ | LF $\nu=-2$<br>ND $=-1.5795$<br>$v=-41$ | $R_{11}=+81.59$<br>$R_{12}=-41.10$ | $S_5=3.00$<br>$S_6=3.00$<br>$T_6=2.40$ |
| $L_7$ | DBC $\nu=-1$<br>ND $=-1.611$<br>$v=-58.4$ | $R_{13}=+41.10$<br>$R_{14}=+107.47$ | $S_7=.00$<br>$T_7=7.21$ |
| $L_8$ | LF $\nu=-2$<br>ND $=-1.5795$<br>$v=-41.$ | $R_{15}=-107.47$<br>$R_{16}=-286.15$ | $S_8=.00$<br>$T_8=2.40$ | wherein, BSC is for borosilicate crown, DF is for dense flint, DBC is for dense borium crown, LF is for light flint, ND is the index of refraction for sodium light (5893-A), V is the Abbe number, R is the radius of curvature of the refracting lens surfaces, S is the axial spacing of the lens elements and T is the axial thickness of the lens elements.

FRANK GERARD BACK.
HERBERT LOWEN.

REFERENCES CITED

The following references are of record in the file of this patent:

UNITED STATES PATENTS

| Number | Name | Date |
|---|---|---|
| 65,729 | Dallmeyer | June 11, 1867 |
| 886,416 | Rudolph | May 5, 1908 |
| 1,610,514 | Graf | Dec. 14, 1926 |
| 1,797,202 | Warmisham | Mar. 17, 1931 |
| 1,899,069 | Warmisham | Feb. 28, 1933 |
| 1,913,389 | Holman | June 13, 1933 |
| 2,158,202 | Schade | May 16, 1939 |
| 2,164,028 | Berek | June 27, 1939 |